(No Model.) 2 Sheets—Sheet 2.

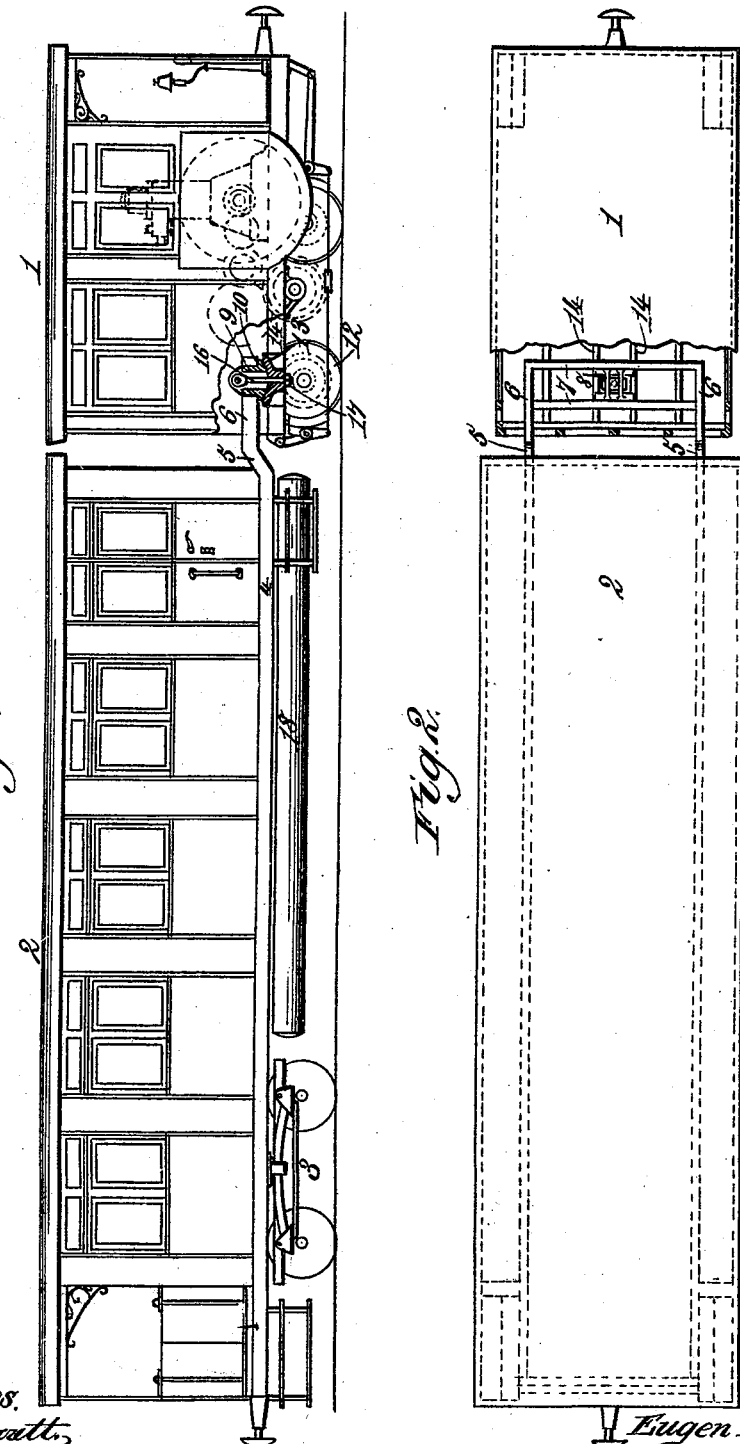

E. LANGEN.
CONSTRUCTION AND CONNECTION OF RAILWAY CARS AND LOCOMOTIVES.

No. 553,756. Patented Jan. 28, 1896.

Witnesses.
Robert Everitt,
Dennis Tumby.

Inventor:
Eugen Langen.
By James L. Norris.
Atty.

UNITED STATES PATENT OFFICE.

EUGEN LANGEN, OF COLOGNE, GERMANY.

CONSTRUCTION AND CONNECTION OF RAILWAY-CARS AND LOCOMOTIVES.

SPECIFICATION forming part of Letters Patent No. 553,756, dated January 28, 1896.

Application filed October 3, 1895. Serial No. 564,515. (No model.)

*To all whom it may concern:*

Be it known that I, EUGEN LANGEN, a subject of the German Emperor, residing at Cologne, Germany, have invented new and useful Improvements in the Construction and Connection of Railway-Cars and Locomotives, of which the following is a specification.

This invention relates to the construction and connection of railway-cars and locomotives, the purpose thereof being to enable an engine and trailer to turn sharp curves with greater ease and safety than has been possible under the conditions heretofore prevailing and to increase the adhesion of the wheels of the locomotive with the track and thereby enable the dead-weight of the engine to be reduced, while its effective power is increased.

It is a further purpose of said invention to provide a construction and organization of parts whereby a considerable space is provided for the gas or oil reservoirs used to supply fuel to a type of locomotive which is coming into frequent use.

The invention, therefore, relates more particularly to the construction and manner of coupling cars to oil or gas consuming locomotives; and it consists in pivotally supporting one end of a trailer directly upon the rearward portion of a locomotive, the other end of said car being mounted upon a standard truck, and in utilizing the space gained by the removal of the forward truck and wheels for the gas or fuel reservoirs which supply the locomotive and which require ample space and to be brought as near as possible to the point of consumption.

The invention will first be described in detail, and then particularly pointed out and defined in the claims which follow this specification.

Figure 3:
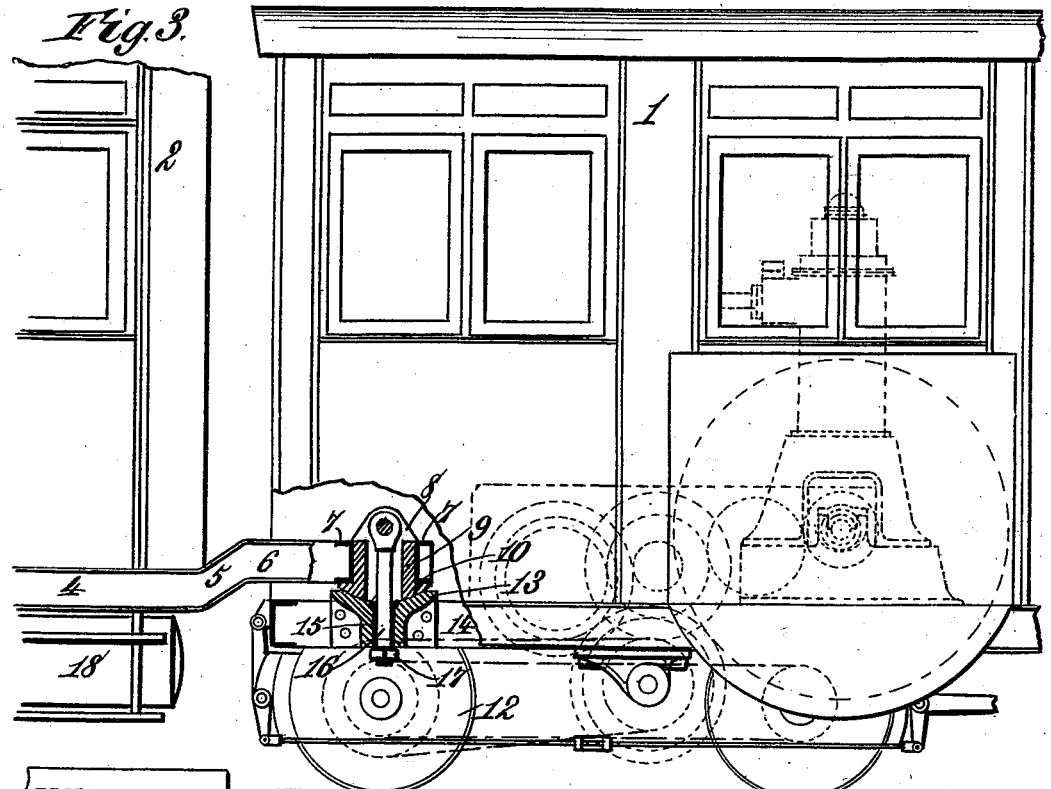
Figure 4:
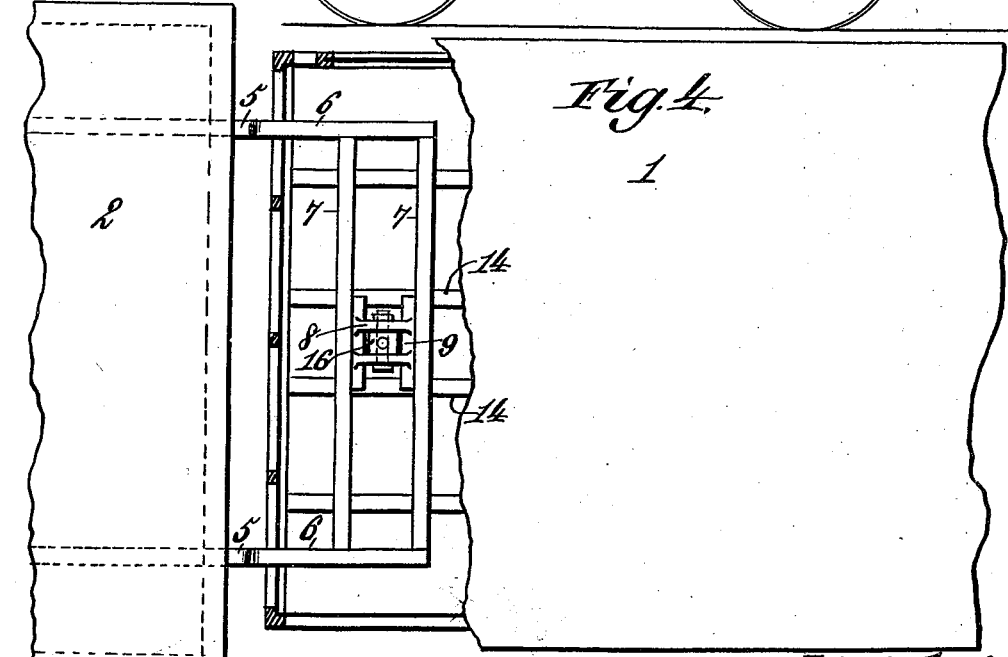

Referring to the drawings which accompany this application, Figure 1 is a side elevation, partly in vertical longitudinal section, showing the practical application of the invention. Fig. 2 is a plan view partly in horizontal section. Fig. 3 is a side elevation of part of a car and locomotive, a portion of the same being broken away to show the coupling in vertical section, the scale being slightly enlarged. Fig. 4 is a plan view of the same partly in lower plan, the end of the locomotive being broken away to show the coupling.

The reference-numeral 1 in said drawings indicates a locomotive of the type now largely used, in which gas is substituted for other kinds of fuel, hydrocarbon oils being also used in a somewhat similar manner. In other respects the engine may be of any preferred construction and size.

The numeral 2 indicates a trailer, which may be a car of any kind adapted for the transportation of passengers or freight. The rearward end of this car—that is to say, the end most distant from the locomotive—is supported upon a standard truck 3 in the usual manner. At the other or forward end the truck is wholly removed and the sills 4 of the car-frame are extended beyond the end of the body of the car, their prolonged ends being raised above the plane of the rearward portions by inclined sections 5 of said sills. The prolonged or forwardly-projecting portions 6 are connected by transverse braces 7 7, between which is arranged a frame 8, provided with a socket-piece 9, which lies in the central longitudinal line of the car. The lower end of this socket-piece is provided with a head 10, having a convex face, its edge extending beyond the circular face of the socket-piece, and the head 10 lying below the lower face of the extended raised ends 6 of the sills.

Upon the frame of the locomotive, over its rear wheels 12, is arranged a concave pivotal seat 13, supported between longitudinal sills 14 of the frame. The concave face of the seat 13 is uppermost and gives a suitable bearing-support to the head 10 of the socket-piece. Through the latter and through the seat 13 is formed a vertical central aperture 15, which receives a center pin 16. The lower end of this pin preferably projects below the seat 13 and may receive a nut 17 to prevent the displacement of the pin.

Beneath the body of the car or trailer 2 are arranged the reservoirs 18, which contain gas under compression, or liquid fuel, such as a hydrocarbon oil. It will be seen from Fig. 1 that the entire removal of the forward truck affords a very considerable additional space for these reservoirs, which would otherwise be correspondingly contracted. This enlargement enables the locomotive to make much longer runs without the necessity of replenishing the reservoirs and thereby effects a material economy in the equipment of a road by largely diminishing the number of replenishing-stations.

What I claim is—

1. The combination with a locomotive of a car, or trailer, having its rearward end supported by a standard truck, and its forward end provided with prolonged sills, a socket-piece mounted on braces between the sills, a pivotal seat carried by the rearward part of the locomotive-frame and having a concave face adapted to receive the convex face of the socket-piece, and a center pin passing through both, substantially as described.

2. The combination with a locomotive having a pivotal seat on the rear part of the frame, of a trailer having a supporting-truck at its rear end and having its sills prolonged at the forward end and provided with horizontal, raised portions united by transverse braces, a socket-piece arranged between said braces and having a convex head to engage the concave seat on the locomotive and a center pin passing through both head and seat and secured by a nut on the lower end, substantially as described.

3. The combination with a gas or oil burning locomotive, of a car or trailer having rigid side sills extending longitudinally over and pivotally supported upon the rear end of the locomotive-frame, and a fuel-reservoir arranged beneath the car or trailer and extending through the space vacated by the removal of the front truck or trailer, substantially as described.

4. The combination with a locomotive, of a car or trailer having one end supported on a standard truck, and its other end constructed with prolonged rigid sills which extend longitudinally over the rear end of the locomotive-frame, and a universal joint supporting the prolonged rigid sills upon the rear end of the locomotive-frame, substantially as described.

In testimony whereof I have hereunto set my hand in presence of two subscribing witnesses.

EUGEN LANGEN.

Witnesses:
MARIE NAGEL,
WILLIAM H. MADDEN.